United States Patent
Tjia et al.

(10) Patent No.: US 7,383,372 B2
(45) Date of Patent: Jun. 3, 2008

(54) BUS SYSTEM, STATION FOR USE IN A BUS SYSTEM, AND BUS INTERFACE

(75) Inventors: Jerome Tjia, Singapore (SG); Bart Vertenten, Leuven (BE)

(73) Assignee: NXP B.V., Eindhoven (NL)

( * ) Notice: Subject to any disclaimer, the term of this patent is extended or adjusted under 35 U.S.C. 154(b) by 173 days.

(21) Appl. No.: 10/517,513

(22) PCT Filed: May 21, 2003

(86) PCT No.: PCT/IB03/02196

§ 371 (c)(1),
(2), (4) Date: Dec. 9, 2004

(87) PCT Pub. No.: WO03/107199

PCT Pub. Date: Dec. 24, 2003

(65) Prior Publication Data

US 2005/0216650 A1  Sep. 29, 2005

(30) Foreign Application Priority Data

Jun. 12, 2002 (WO) .............. PCT/SG02/00162

(51) Int. Cl.
*G06F 13/00* (2006.01)

(52) U.S. Cl. .............. 710/315; 710/313; 710/60; 710/33; 710/61

(58) Field of Classification Search ........ 710/305–317, 710/2–19, 36–38, 60–61
See application file for complete search history.

(56) References Cited

U.S. PATENT DOCUMENTS 6,259,706 B1  7/2001  Shimada (Continued)

OTHER PUBLICATIONS

Anonymous: "Enhanced Host Controller Interface Specification For Universal Serial Bus. Rev. 1.0" [Online] Mar. 12, 2002 Retrieved From the Internet: <URL: www.Intel.com/Technology/USB/Download/EHCI-R10.PDF.

*Primary Examiner*—Raymond Phan
(74) *Attorney, Agent, or Firm*—Peter Zawilski

(57) ABSTRACT

The invention relates to a bus system comprising a first station and a second station coupled by a bus for transferring signals. The bus is arranged to operate according to a protocol in which said first station repeatedly sends requests for data to the second station. The protocol comprises a first mode for transferring the requests in a first request format at a first communication speed and at least a second mode for transferring said requests in a second request format at a second speed. The second station is arranged to receive requests in a mode selected from a group of modes comprising said first and second modes, and is arranged to give a first indication to said first station if it is arranged to operate according to the first mode and a second indication if it is arranged to operate according to the second mode. The first station comprises a processor, a controller, and a translator. The processor is operable to generate request properties for requests in the first request format. The controller is operable to generate the requests in the first request format from the request properties. The controller is also operable to transmit the request in the first format to the second station upon detection of the first indication and to forward the requests to the translator upon detection of the second indication. The translator is also operable to transmit the requests in the second format to the second station.

21 Claims, 2 Drawing Sheets

U.S. PATENT DOCUMENTS

| | | | |
|---|---|---|---|
| 6,721,815 B1 * | 4/2004 | Leete | 710/6 |
| 6,775,733 B2 * | 8/2004 | Chang et al. | 710/313 |
| 6,874,055 B2 * | 3/2005 | Chiang et al. | 710/316 |
| 6,901,471 B2 * | 5/2005 | Govindaraman | 710/305 |
| 6,959,355 B2 * | 10/2005 | Szabelski | 710/313 |
| 6,990,550 B2 * | 1/2006 | Hesse et al. | 710/313 |
| 7,000,057 B1 * | 2/2006 | Novell et al. | 710/306 |
| 2004/0024920 A1 * | 2/2004 | Gulick et al. | 710/1 |

* cited by examiner

BUS SYSTEM, STATION FOR USE IN A BUS SYSTEM, AND BUS INTERFACE

The invention relates to a bus system comprising a first station and a second station coupled by a bus for transferring signals, said bus being arranged to operate according to a protocol in which said first station repeatedly sends requests for data to said second station, said protocol comprising a first mode for transferring said requests in a first request format at a first communication speed and at least a second mode for transferring said requests in a second request format at a second speed, said second station being arranged to receive requests in a mode selected from a group of modes comprising said first and second modes, and being arranged to give a first indication to said first station if it is being arranged to operate according to said first mode and a second indication if it is being arranged to operate according to said second mode.

The invention also relates to a station for use in a bus system comprising a connection for a bus, said station being arranged to operate according to a protocol in which said station repeatedly sends requests to said connection, said protocol comprising a first mode for transferring said requests in a first request format at a first communication speed and at least a second mode for transferring said requests in a second request format at a second speed.

The invention also relates to a bus interface for use in a bus system comprising a connection for a bus and an input for receiving request properties from a processor, said bus interface being arranged to operate according to a protocol in which said bus interface repeatedly sends requests to said connection, said protocol comprising a first mode for transferring said requests in a first request format at a first communication speed and at least a second mode for transferring said requests in a second request format at a second speed.

Such a bus system is disclosed in the Universal Serial Bus (USB) specification. The USB specification is a standard promulgated by a group of companies including Compaq Computer Corporation, Hewlett-Packard Company, Intel Corporation, Lucent Technologies Inc, Microsoft Corporation, NEC Corporation, and Koninklijke Philips Electronics N.V. Described below are various aspects of the USB relevant to a complete understanding of the present invention. Further background concerning the USB may be obtained from USB Specification 2.0, which is included herein by reference.

The USB is a standard bus designed to support data exchange between a personal computer and a wide variety of peripherals: e.g. webcams, printers, scanners, microphones and keyboards. The USB thus replaces existing interfaces such as the RS-232C serial ports, parallel ports, and PS/2 interfaces.

In a bus system like a USB system, electronic bus stations are connected to each other via a bus. Usually a bus station comprises a processor or computing system to process or generate data and to control the flow of data. USB stations are defined as hosts (e.g. personal computers) and as devices (peripherals). Generally there is only one host in any USB system. A USB interface at the host is also referred to as a host controller. The host controller may be implemented in a combination of hardware, firmware, or software. USB devices are defined as hubs, which provide additional attachment points or functions, which provide capabilities to the system. The devices are connected to the host via a tiered-star topology. Hubs indicate the attachment or removal of a USB device. The host determines if a newly attached USB device is a hub or a function and assigns a unique USB address to the USB device. All USB devices are accessed by a unique USB address. Each device additionally supports one or more endpoints with which the host may communicate.

The USB is a polled bus. The host controller initiates all data transfers. Most bus transactions involve the transmission of up to three packets. Each transaction begins when the host controller, on a scheduled basis, sends a USB packet describing the type and direction of the transaction, the USB device address, and endpoint number. This packet is referred to as the "token packet". The USB device that is addressed selects itself by decoding the appropriate address fields. In a given transaction, data is transferred either from the host to a device or from a device to the host. The direction of data transfer is specified in the token packet. The source of the transaction then sends a data packet or indicates it has no data to transfer. The destination, in general, responds with a handshake packet indicating whether the transfer was successful.

USB supports three ranges of data traffic workloads: high-speed, full-speed, and low-speed. The low-speed data range is intended for interactive devices such as keyboards, mice, and game peripherals and supports communications of 10-100 kb/sec. The full-speed data range is intended for phone, audio, and compressed video applications and supports communications of 500 kb/sec-10 Mb/sec. The high-speed data range is intended for video and storage applications and supports communications of 25-400 Mb/sec.

USB has become a popular interface for exchanging data between PCs and peripherals. An increasing number of portable peripherals, as for instance digital still cameras, video cameras, personal digital assistants, and cellular phones, are using the USB to interface to communicate with the PC. Many of these portable devices would benefit from being able to communicate to each other via the USB interface, yet certain aspects of USB make this difficult to achieve. Specifically, USB communication can only take place between a host and a peripheral. However, in order to qualify as a PC host, a device must have several characteristics, including: a storage for a large number of device drivers, the ability to source a large current, and a Series "A" host connector receptacle. It is not practical for many portable devices to have all of the above characteristics, and in many cases these characteristics are not needed in order to interface portable devices with each other.

In order to enable these limited-requirement, portable USB applications, USB On-The-Go (OTG), a supplement of the USB 2.0, was developed by contributors from several companies, including Koninklijke Philips Electronics N.V. OTG allows a portable device to take on the role of a limited USB host, without the burden of supporting all the above functions of a PC. OTG, as a supplement to the USB 2.0 specification, defines a minimal set of changes to the USB 2.0 specification, such that portable USB applications are enabled. Further background concerning OTG may be obtained from the On-The-Go Supplement to the USB 2.0 Specification, Revision 1.0 , which is included herein by reference.

A USB 2.0 or OTG host controller includes one high-speed host controller that supports high-speed communication and may comprise one or more companion host controllers that support full-speed and low-speed communications. The high-speed host controller host controller implements an Enhanced Host Controller Interface (EHCI) and is, therefore, also referred to as EHCI host controller or eHC. It is used for all high-speed communications with high-speed devices connected to the host controller. The companion host controller implements for instance the Universal Host Controller Interface (UHCI) or Open Host Controller Interface for USB (OHCI). The companion host controller or cHC handles communications with full-speed or low-speed devices connected to the host controller. Summarized, to support such a USB 2.0 or OTG host controller in fact includes two separate host controllers, an eHC and a cHC.

The invention is based on the insight that a disadvantage of this "two-engine" approach is that both the eHC and the cHC require separate software drivers. This is a constraint in for instance an embedded environment, as is present in a portable application, where hardware and software resources are limited. Another disadvantage of this approach is that product development takes more time, since two separate software drivers have to be developed and debugged. Furthermore, the operating system needs to schedule data communications for both the eHC and the cHC.

Amongst others it is an object of the invention to provide a bus system more suitable for portable applications by simplifying the design of the first station.

To this end, the invention provides a bus system as defined in the opening paragraph which is characterized in that said first station comprises a processor, a controller, and a translator, said processor being operable to generate request properties for requests in said first request format, said controller being operable to generate said requests in said first request format from said request properties, further being operable to transmit said request in said first format to said second station upon detection of said first indication and to forward said request to said translator upon detection of said second indication, and said translator being operable to transmit said request in said second format to said second station.

In operation the processor within the first station needs to provide information to the second station or needs to obtain information from the second station. To this end, the first station needs to communicate with the second station via the bus. In a polled bus system, as for instance a USB system, communications are initiated by the first station, by sending requests. The second station is arranged to receive the requests in either the first or the second mode. The second station indicates by means of the first indication that it operates in the first mode or it indicates by means of the second indication that it operates in the second mode. Therefore, the first station needs to be arranged to transmit the requests in both the first mode and in the second mode.

In the bus system according to the invention the translator, if required, handles the second mode of transferring requests in the second request format at the second communication speed. Therefore, the processor does not have to distinguish between requests to be transmitted in the first mode and requests to be transmitted in the second mode. For this reason it is sufficient that the processor is operable to generate request properties for requests to be transmitted in the first mode. Thus the processor only needs sufficient hardware and software resources to generate request properties for requests in the first format. This simplifies the design of the first station of the bus system, thereby making it more suitable for portable applications.

An embodiment of the bus system according to the invention is characterized in that said second station is assigned an address, said request properties comprise address information, whereby said controller is operable to determine from said address information if said request is to be transmitted in said first or second format respectively.

Once coupled to the first station via the bus, every second station indicates to the first station either by the first indicator that it communicates in the first mode or by the second indicator that it communicates in the second mode. By assigning a unique address to every second station coupled via the bus to the first station it will be known to the controller whether a certain second station communicates in the first mode or in the second mode. Thus the address information contained in the request properties will be sufficient for the controller to determine in which format the request should be transmitted and hence whether or not the request should be forwarded to the translator. This further simplifies the design of the second station.

A further embodiment of the bus system according to the invention is characterized in that said first station also comprises a router for routing said requests transmitted in said first and second modes by said controller and said translator, respectively, to said bus.

By using a router every second station coupled to the first station is either coupled to the controller or to the translator. In this way potential bus conflicts between the controller and the translator are circumvented. This further simplifies the design of both the controller and the translator.

Yet another embodiment of the bus system according to the invention is characterized in that said first mode is also conceived for transferring responses in a first response format at said first communication speed and said second mode is also conceived for transferring said responses in a second response format at said second speed, said second station is operable to transmit responses to said first station in a mode selected from a group of modes comprising said first and second modes, said translator is operable to receive said responses in said second response format and to forward said responses to said controller, said controller is operable to receive said responses in said first response format and to generate response properties from said responses in said first response format, and said processor is operable to handle said response properties generated by said controller.

By having the translator handle both requests and responses in the respective second formats, the hardware and software resources required in the first station are further reduced, resulting in a bus system more suitable for portable applications.

A station according to the invention for use in a bus system comprises a connection for a bus, said station being arranged to operate according to a protocol in which said station repeatedly sends requests to said connection, said protocol comprising a first mode for transferring said requests in a first request format at a first communication speed and at least a second mode for transferring said requests in a second request format at a second speed, characterized in that said station comprises a processor, a controller, and a translator, said translator being operable to generate request properties for requests in said first request format, said controller being operable to generate said requests in said first request format from said request properties, further being operable to transmit said request in said first format to said connection and to forward said request to said translator, and said translator being operable to transmit said requests in said second format to said connection.

A bus interface according to the invention for use in a bus system comprises a connection for a bus and an input for receiving request properties from a processor, said bus interface being arranged to operate according to a protocol in which said bus interface repeatedly sends requests to said connection, said protocol comprising a first mode for transferring said requests in a first request format at a first communication speed and at least a second mode for transferring said requests in a second request format at a second speed, characterized in that said bus interface comprises a controller and a translator, whereby said input is operable to receive request properties for requests in said first request format, said controller being operable to generate said requests in said first request format from said request properties, further being operable to transmit said requests in said first format to said connection and to forward said requests to said translator, and said translator being operable to transmit said requests in said second format to said connection.

In operation the bus interface according to the invention only receives request properties in the first request format at its input. The controller will only receive request properties from the processor in the first request format. If required, the translator translates requests to requests in the second request format. Therefore, the controller needs less hardware and software resources, thereby simplifying its design. This results in a bus interface more suitable for portable applications.

The above and other objects and features of the present invention will become apparent from the following detailed description considered in conjunction with the accompanying drawings, in which.

In these figures identical parts are denoted by identical references.

Figure 1:
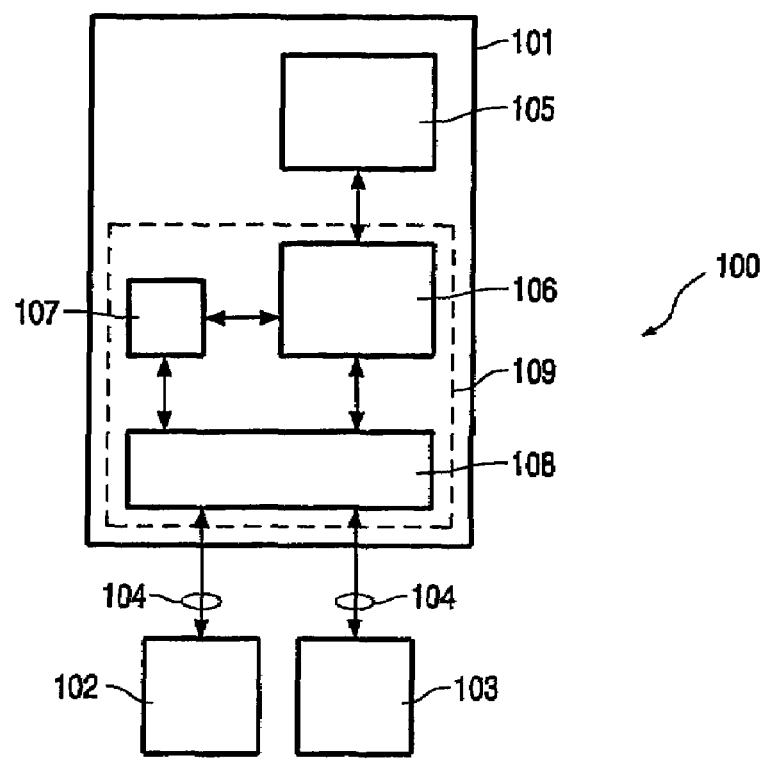
FIG. 1 is a block diagram showing a bus system according to the invention.

FIG. 1 is a block diagram showing a bus system according to the invention. The shown bus system 100 may be for instance a USB 2.0 or OTG system. It comprises a first station or host 101, a second station or device 102, 103, and a bus 104 coupling the first station 101 to the second station 102, 103. The first station 101 comprises a processor 105, a controller 106, also referred to as host controller, a translator 107, and a router 108, also referred to as port router. The controller 106, the translator 107, and the router 108 may be included in a bus interface 109 as is indicated in FIG. 1.

In a bus system such as USB 2.0 or OTG, the device 102, 103 is operable to communicate in one of three possible modes: high-speed, full-speed, and low-speed. It is operable to give an indication to the host 101 in the usual way as defined in the USB 2.0 specification if it is operable to communicate in the high-speed mode, also referred to as the first mode, or in the full-speed or low-speed mode, also jointly referred to as the second mode. This involves low level signaling which takes place after the device 102, 103 is connected to the bus 104 and after a reset of the device 102, 103.

In a host centric bus system such as USB 2.0 or OTG the host 101 in operation repeatedly sends requests to the device 102, 103. The device responds to these requests by way of responses. In the first mode of communication in the bus system 101 requests are transmitted by the host 101 and received by the device 102, 103 in the first request format at the first speed, while responses are transmitted by the device 102, 103 and received by the host in the first response format at the first speed. In the second mode of communication in the bus system 101 requests are transmitted by the host 101 and received by the device 102, 103 in the second mode at the second speed, while responses are transmitted by the device 102, 103 and received by the host in the second response format at the second speed. For details on the formats of high-speed requests and responses (the first mode of communication) and full-speed and low-speed requests (the second mode of communication) see the USB 2.0 specification.

In the bus system 100, the processor 105 is operable to generate request properties for requests to be transmitted to the device 102, 103. The processor generates request properties for requests in the first request format. Based on for instance the address information or mode information contained in the request properties, the controller 106 decides if the request based on the request properties should be transmitted in the first format or in the second format. If the request should be transmitted in the first format, the request is generated and transmitted by the controller 106. If the request should be transmitted in the second format, the request or the request properties are forwarded by the controller 106 to the translator 107. The translator 107 translates the request or the request properties to a request in the second format. The router 108 routes both requests originating from the controller 106 and the translator 107 to the bus 104.

The processor 105 is also operable to handle response properties of responses transmitted by the device 102, 103. A response received by the host 101 in the first response format is routed by the router to the controller 106. The controller 106 generates response properties for a response in the first format and transmits these properties to the processor 105. A response received by the host 101 in the second response format is routed by the router to the translator 107. The translator 107 translates the response in the second format to a response in the first format and forwards the response to the controller 106. The controller 106 generates response properties for a response in the first format and transmits these properties to the processor 105.

The advantage of this way of communicating requests and responses is that both the processor 105 and the controller 106 need only be operable to handle request properties and requests in the first mode. Thus, in a USB 2.0 or OTG system the processor 105 and the controller 106 may treat all devices 102, 103 as if they are high-speed devices. Consequently, the processor 105 and the controller 106 only need to take care of high-speed communication. The translator 107 performs the required translation from high-speed communication to full-speed or low-speed and vice versa.

In a USB 2.0 system the controller 106 is a host controller and the processor 105 is a system processor, for instance the microprocessor of a personal computer. In such a system communication between the controller 106 and the processor 105 would take place via a PCI bus. Thus, the request and response properties would be transferred in the form of messages via the PCI bus. In an OTG system connecting a portable application and a device the processor 105 could be the system processor of the portable application. In such a system communication between the processor 105 and the controller 106 could for instance take place via a parallel bus connected to a parallel port on the processor 105 and a parallel port of the controller 106 or bus interface 109. The request and response properties would thus be transferred in the form of messages in a suitable format via the parallel bus.

Figure 2:
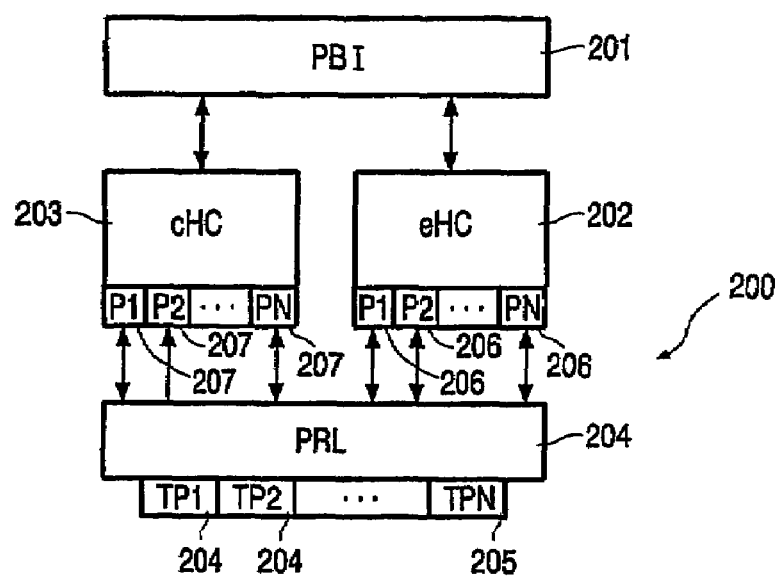
FIG. 2 is a block diagram showing a known bus interface.

FIG. 2 is a block diagram showing a known bus interface. The block diagram shows a USB 2.0 host controller as defined in the EHCI (Enhanced Host Controller) Specification for Universal Serial Bus, version 1.0, Mar. 12, 2002, which is included herein by reference. The bus interface 200, also referred to as host controller, comprises an interface 201 to a system processor, a high-speed host controller 202, also referred to as eHC, and a companion host controller 203 which is also referred to as cHC. According to the EHCI specification, the cHC should be USB 1.1 compatible. The cHC may be omitted. There may also be several cHCs. The host controller 200 also comprises a router or port routing logic 204, also referred to as PRL. The port routing logic routes the ports 205 of the high-speed host controller and the ports 206 of the companion host controller 203 to the root ports 205 of the host controller 200. The high-speed host controller 202 implements an EHCI interface. It is used for all high-speed communications to high-speed devices connected to the root ports 205 of the host controller 200. The EHCI specification allows communications to full-speed and low-speed devices connected to the root ports 205 of the host controller 200 to be provided by the companion USB 1.1 host controller 203. The high-speed host controller 202 cannot operate with a full-speed or low-speed device. The port transceiver routing logic 204 is the key to providing this flexible operating environment.

The companion host controller 203 may be any USB 1.1 host controller. It may for instance implement an Open Host Controller Interface (OHCI) or Universal bus Host Controller Interface (UHCI). The companion host controller 203 manages the full-speed and low-speed USB devices connected to the root ports 205. The companion host controller 203 has no knowledge of the high-speed host controller 202. High-speed devices are routed to and controlled by the high-speed host controller 202. When running and configured, the high-speed host controller 202 is the default owner of all the root ports 205. This means that all default root ports 205 are routed to the ports 206 of the high-speed host controller. The high-speed controller 202, together with its driver software resident at the system processor, initially detects all devices attached and assigns addresses to these devices. If an attached device appears not to be a high-speed device, the high speed host controller 202 surrenders ownership of the port, and hence control of the device, to the companion host controller 203. For that port enumeration starts again from the initial attach detect point and the device is enumerated, assigned an address, under the control of the companion host controller 203. Otherwise, the high-speed host controller retains ownership of the port and the device completes enumeration under the control of the high-speed host controller 202.

The main disadvantage of this so-called "two-engine" architecture is that two software stacks are needed on the system processor, that is, one for the high-speed host controller 202, implementing the EHCI, and one for the companion host controller 203, implementing either the OHCI or the UHCI. This can be a major constraint, especially in an embedded environment where hardware and software resources are very limited. Other practical disadvantages of this architecture include "double" debugging efforts, and the implementation of two scheduling schemes for the operating system on the system processor. Both result in longer time to market. Furthermore, this architecture proves to require more hardware (a higher gate count) in the host controller 200 compared to the architecture of the bus interface 109 according to the invention as shown in FIG. 1.

Figure 3:
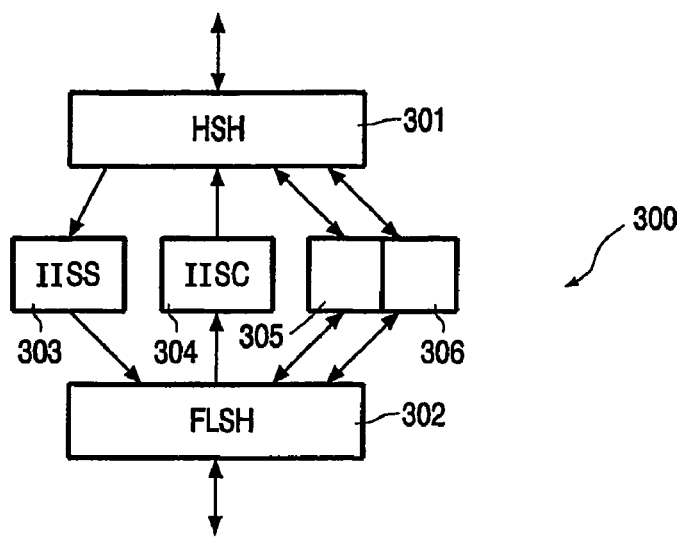
FIG. 3 is a block diagram showing a known translator.

FIG. 3 is a block diagram showing a known translator. The block diagram shows a transaction translator 300 as specified in the USB 2.0 specification for inclusion in a USB 2.0 hub. This transaction translator 300 will be discussed briefly. More details are provided in the USB 2.0 specification. The transaction translator 300 comprises a high-speed handler 301, a full-speed/low-speed handler 302, and buffers 303, 304, 305, and 306. The high-speed handler 301 is arranged for communication in the high-speed mode, accepts requests from the host which are to be translated to full-speed or low-speed requests, and transmits responses to the host which are translated from full-speed or low-speed responses. The full-speed/low-speed handler 302 accepts responses from a device which are to be translated to high-speed responses and transmits requests to the device which are translated from high-speed requests. The buffers 303, 304, 305, and 306 hold transactions that are in progress and track the state of each buffered transaction as it is processed by the transaction translator 300. Transactions consist of requests transmitted by the host and responses transmitted by a device. The buffers 303, 304, 305, and 306 provide the connection between the high-speed handler 301 and the full-speed/low-speed handler 302. The arrows indicate the flow of data.

The state tracking of the transaction translator 300 depends on the specific USB transfer type of the transactions. Possible transfer types are bulk, control, interrupt, and isochronous. The high-speed handler 301 accepts high-speed start-split transactions or responds to high-speed complete-split transactions. The high-speed handler 301 places the start-split transactions in the buffers 303 and 304 for use by the full-speed/low-speed handler 302.

The buffered start-split transactions provide the full-speed/low-speed handler 302 with the information that allows it to issue corresponding full-speed or low-speed transactions to full-speed or low-speed devices, respectively. The full-speed/low-speed handler buffers the results of these full-speed or low-speed transactions in the buffers 303 and 304 so that they can be returned by the high-speed handler 301 with a corresponding complete-split transaction on the high-speed bus.

It should be noted that the transaction translator as shown in FIG. 3 is different from the translator 107 included in the bus system 100 according to the invention as shown in FIG. 1. The translator 107 is incorporated in the bus interface itself and not in a hub. Communication from the translator 107 in the direction of the processor 105 and vice versa is non-USB communication. Upstream communication, that is, to and from the host, of the transaction translator 300 is high-speed USB communication. Thus, on top of the required USB 1.1 driver software in the system processor, a conventional USB 2.0 system implementing high-speed, full-speed, and low-speed communication requires a hub with a transaction translator 300, thereby further increasing the required hardware resources.

Figure 4:
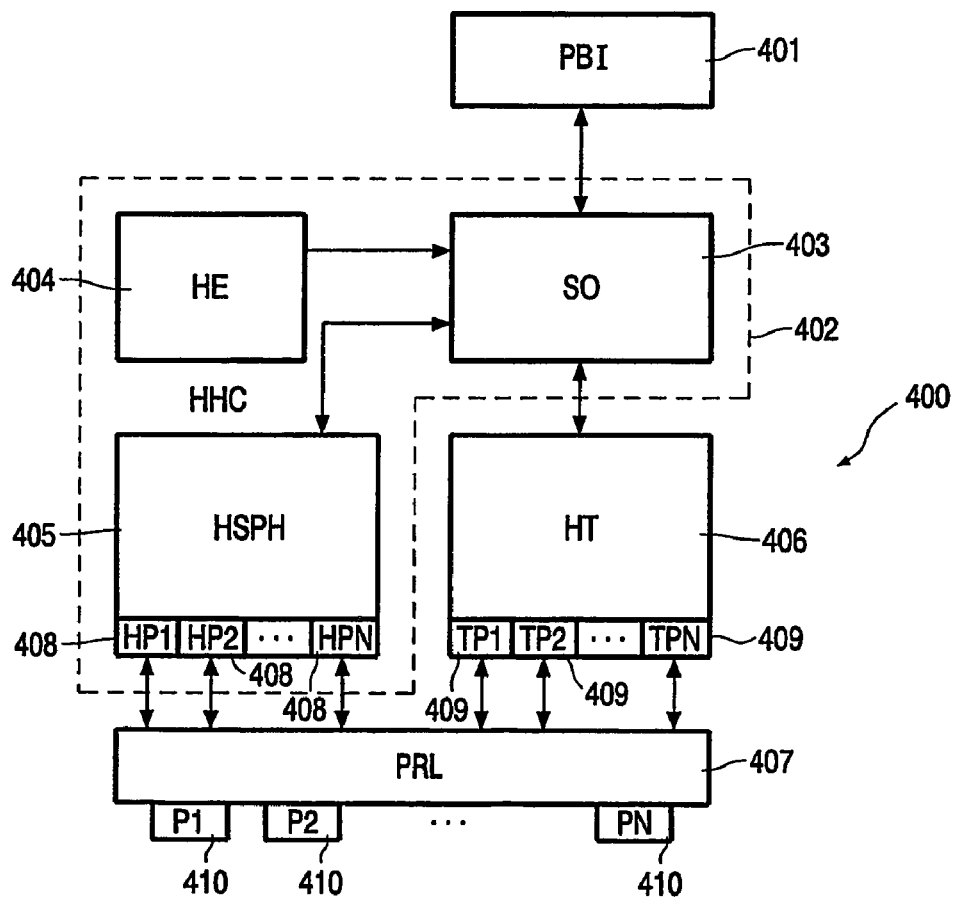
FIG. 4 is a block diagram showing a bus interface according to the invention.

FIG. 4 is a block diagram showing a bus interface according to the invention. The bus interface 400 comprises an interface 401 to a system processor, a high-speed controller 402, a translator 406, and a router 407. The high-speed controller 402 comprises a structure decoder 403, a hub emulator 404, and a high-speed packet handler 405.

The interface 401 to the system processor may be an interface to any system bus, for instance a PCI or AHB bus.

The high-speed controller comprises a structure decoder 403 that handles all structures, also referred to as request properties, as defined in the EHCI specification. The structure decoder 403 fetches the data structures that are defined in the EHCI specification and decodes the different fields within these structures. These fields specify the device address, device endpoint number, device speed, the number of bytes that need be sent or received, etc. Based on this decoded information the structure decoder 403 will start a request to the hub emulator 404, the high-speed packet handler 405, or the translator 406.

If the device address equals the address of the hub emulator 404, the request is issued to the hub-emulator 404 and the status is directly returned to the system processor and updated in the system memory without using the USB bus. If the device address is different from the address of the hub emulator 404, the device speed field indicates which module should handle this request. If the device speed field indicates a high-speed device, the high-speed packet handler 405 handles the request. The high-speed packet handler 405 issues a high-speed USB transaction on all high-speed ports 408. The status of this USB transaction is returned to the structure decoder 403 that returns the status information to the system processor which updates the status information in the system memory. If the device-speed field indicates a full-speed or low-speed device the structure decoder issues a request to the translator 406. The translator 406 will use the information from the structure decoder 403 to start a USB transaction on the full-speed and low-speed bus.

The high-speed packet handler 405 issues the request of the structure decoder 403 immediately on the USB bus. The translator 406 has internally a queue system that allows the storage of a couple of requests. This is done to be compatible with a conventional USB 2.0 system comprising an EHCI and a USB 2.0 hub. In such a conventional system two high-speed transactions have to be issued in order to complete one full-speed or low-speed transaction. The first high-speed transaction gives the information to the transaction translator 300, as shown in FIG. 3, to start the transaction on the full-speed or low-speed bus. The second high-speed transaction to the transaction translator 300 is issued to retrieve the status information of the transaction that was issued on the full-speed or low-speed bus.

In the bus interface 400 according to the invention the same principle is used, but without using the high-speed USB bus. Both requests will be directly issued to the translator 406. After the first request, called start-split, it will start the transaction on the full-speed/low-speed USB bus. On the second request, called complete-split, the translator 406 will return the status information of the transaction it performed on the full-speed/low-speed bus. Based on the USB specification, the translator 406 will start USB transactions on the full-speed/low-speed bus at the appropriate time. The results of these transactions are stored locally in the translator 406 and returned after a complete-split is received.

An advantage of the bus interface 400 over a conventional EHCI in combination with a USB 2.0 hub is that in the conventional combination all communication with the transaction translator 300 as shown in FIG. 3, incorporated in the USB 2.0 hub, is sent via the entire USB tree. In the architecture of the bus interface 400 the high-speed USB transfers can be handled in parallel with the communication to the translator 406.

Furthermore, in a conventional combination of an EHCI and a USB 2.0 hub all full-speed and low-speed bus traffic has to be transferred at high-speed to the USB 2.0 hub. In the bus system according to the invention high-speed and full-speed/low-speed traffic are separated from each other. The full-speed/low-speed traffic that has to be sent by the translator 406 is not transferred on the high-speed bus. This off-loads the high-speed bus and allows to issue more transactions on the high-speed bus than in a conventional combination of an EHCI and a USB 2.0 hub.

The router 407, also referred to as port routing logic, determines the speed of the connected USB devices. If the USB device connected to a port 410 of the router 407 is a high-speed device, it will route the port to the corresponding high-speed port 409 of the high-speed packet handler 405. If the device connected to the port 410 is a full-speed or low-speed port, it will route the port 410 to the corresponding full-speed/low-speed port 409 of the translator 406.

The embodiments of the present invention described herein are intended to be taken in an illustrative and not a limiting sense. Various modifications may be made to these embodiments by persons skilled in the art without departing from the scope of the present invention as defined in the appended claims.

The invention claim is:

1. A bus system comprising a first station and a second station coupled by a bus for transferring signals, said bus being arranged to operate according to a protocol in which said first station repeatedly sends requests for data to said second station, said protocol comprising a first mode for transferring said requests in a first request format at a first communication speed and at least a second mode for transferring said requests in a second request format at a second speed, said second station being arranged to receive requests in a mode selected from a group of modes comprising said first and second modes, and being arranged to give a first indication to said first station if it is being arranged to operate according to said first mode and a second indication if it is being arranged to operate according to said second mode, wherein said first station comprises a processor, a controller, and a translator, said processor being operable to generate request properties for requests in said first request format, said controller being operable to generate said requests in said first request format from said request properties, further being operable to transmit said request in said first format to said second station upon detection of said first indication and to forward said request to said translator upon detection of said second indication, and said translator being responsive to said request to start a transaction in said second format directed to said second station.

2. A bus system according to claim 1, wherein said bus system is a USB system.

3. A bus system according to claim 1, wherein said request properties comprise mode information whereby said controller is operable to determine from said mode information if said request is to be transmitted in said first or second format, respectively.

4. A bus system according to claim 1, wherein said second station is assigned an address, said request properties comprise address information whereby said controller is operable to determine from said address information if said request is to be transmitted in said first or second format, respectively.

5. A bus system according to claim 1, wherein said first station also comprises a router for routing said requests transmitted in said first and second modes by said controller and said translator, respectively, to said bus.

6. A bus system according to claim 1, wherein said first mode is also conceived for transferring responses in a first response format at said first communication speed and said second mode is also conceived for transferring said responses in a second response format at said second speed, said second station is operable to transmit responses to said first station in a mode selected from a group of modes comprising said first and second modes, said translator is operable to receive said responses in said second response format and to forward said responses to said controller, said controller is operable to receive said responses in said first response format and to generate response properties from said responses in said first response format, and said processor is operable to handle said response properties generated by said controller.

7. A bus system according to claim 6, wherein, said first Station also comprises a router for routing said responses transmitted by said second station to said translator and to said controller, whereby said router is operable to route said responses to said controller upon detection of said first indication and to said translator upon detection of said second indication.

8. A station for use in a bus system comprising a connection for a bus, said station being arranged to operate according to a protocol in which said station repeatedly sends requests to said connection, said protocol comprising a first mode for transferring said requests in a first request format at a first communication speed and at least a second mode for transferring said requests in a second request format at a second speed, wherein said station comprises a processor, a controller, and a translator, said translator being operable to generate request properties for requests in said first request format, said controller being operable to generate said requests in said first request format from said request properties, further being operable to transmit said request in said first format to said connection and to forward said request to said translator, and said translator being responsive to said request to start a transaction in said second format on said connection.

9. A station according to claim 8, wherein said station is a USB host.

10. A station according to claim 8, wherein said request properties comprise mode information whereby said controller is operable to determine from said mode information if said request is to be transmitted in said first or second format, respectively.

11. A station according to claim 8, wherein said request properties comprise address information whereby said controller is operable to determine from said address information if said request is to be transmitted in said first or second format, respectively.

12. A station according to claim 8, wherein said station also comprises a router for routing said requests transmitted in said first and second modes by said controller and said translator, respectively, to said connection.

13. A station according to claim 8. wherein said first mode is also conceived for transferring responses in a first response format at said first communication speed and said second mode is also conceived for transferring said responses in a second response format at said second speed, said translator is operable to receive said responses in said second response format from said connection and to forward said responses to said controller in said first format, said controller is operable to receive said responses in said first response format from said connection and to generate response properties from said responses in said first response format, and said processor is operable to handle said response properties generated by said controller.

14. A station according to claim 13, wherein said station also comprises a router for routing said responses received at said connection to said translator and to said controller, whereby said router is operable to route said responses to said controller if said responses are received in said first format and to said translator if said responses are received in said second format.

15. A bus interface for use in a bus system comprising a connection for a bus and an input for receiving request properties from a processor, said bus interface being arranged to operate according to a protocol in which said bus interface repeatedly sends requests to said connection, said protocol comprising a first mode for transferring said requests in a first request format at a first communication ion speed and at least a second mode for transferring said requests in a second request format at a second speed, wherein said bus interface comprises a controller and a translator, whereby said input is operable to receive request properties for requests in said first request format, said controller being operable to generate said requests in said first request format from said request properties, further being operable, to transmit said requests in said, first format to said connection and to forward said requests to said translator, and said translator being responsive to said request to start transactions in said second format on said connection.

16. A bus interface according to claim 15, wherein said bus interface is a bus interface for a USB host.

17. A bus interface according to claim 15, wherein said request properties comprise mode information whereby said controller is operable to determine from said mode information if said requests are to be transmitted in said first or second format, respectivcely.

18. A bus interface according to claim 15, wherein said bus interface also comprises a router for routing said requests transmitted in said first and second modes by said controller and said translator, respectively, to said connection.

19. A bus interface according to claim 15, wherein said first mode is also conceived for transferring responses in a first response format at said first communication speed and said second mode is also conceived for transferring said responses in a second response format at said second speed, said translator is operable to receive said responses in said second response format from said connection and to forward said responses to said controller in said first format, said controller is operable to receive said responses in said first response format from said connection and to generate response properties from said responses in said first response format, and said bus interface comprises an output for transmitting said request properties to said processor.

20. A bus interface according to claim 17, wherein said request properties comprise address information, whereby said controller is operable to determine from said address information if said requests are to be transmitted in said first or second format, respectively.

21. A bus interface according to claim 19, wherein said station also comprises a router for routing said responses received at said connection to said translator and to said controller, whereby said router is operable to route said responses to said controller if said responses are received in said first format and to said translator if said responses are received in said second format.

* * * * *